United States Patent
Mese et al.

(10) Patent No.: US 7,191,077 B2
(45) Date of Patent: Mar. 13, 2007

(54) SMART BATTERY CHARGING SYSTEM, METHOD, AND COMPUTER PROGRAM PRODUCT

(75) Inventors: John Carl Mese, Cary, NC (US); Nathan J. Peterson, Raleigh, NC (US); Rod David Waltermann, Rougemont, NC (US); Arnold S. Weksler, Raleigh, NC (US)

(73) Assignee: Lenovo Singapore Pte Ltd, Singapore (SG)

( * ) Notice: Subject to any disclaimer, the term of this patent is extended or adjusted under 35 U.S.C. 154(b) by 0 days.

(21) Appl. No.: 10/744,775

(22) Filed: Dec. 23, 2003

(65) Prior Publication Data

US 2005/0134225 A1 Jun. 23, 2005

(51) Int. Cl.
 *G01R 31/36* (2006.01)
(52) U.S. Cl. ....................................................... 702/63
(58) Field of Classification Search ................. 702/63, 702/108, 182, 183, 187
 See application file for complete search history.

(56) References Cited

U.S. PATENT DOCUMENTS

| | | | |
|---|---|---|---|
| 5,895,440 A | 4/1999 | Proctor et al. | |
| 6,075,340 A | 6/2000 | Koenck | |
| 6,337,560 B1 * | 1/2002 | Kalogeropoulos et al. | 320/160 |
| 6,424,123 B1 | 7/2002 | Odaohhara et al. | |
| 6,433,511 B1 * | 8/2002 | Bohne | 320/131 |
| 6,433,515 B2 | 8/2002 | Sakakibara | |
| 6,522,101 B2 | 2/2003 | Malackowski | |
| 6,577,104 B2 | 6/2003 | Sakakibara | |
| 2002/0001745 A1 * | 1/2002 | Gartstein et al. | 429/61 |
| 2002/0101218 A1 | 8/2002 | Koenck et al. | |
| 2002/0149346 A1 | 10/2002 | Sakakibara | |
| 2003/0057918 A1 | 3/2003 | Aoki et al. | |

* cited by examiner

*Primary Examiner*—John Barlow
*Assistant Examiner*—Demetrius Pretlow
(74) *Attorney, Agent, or Firm*—Synnestvedt & Lechner LLP; Carlos Munoz-Bustaman

(57) ABSTRACT

An intelligent battery charger is disclosed which tracks usage of the computer by the user and the charging and usage habits of the user. This tracking includes dates, times, and elapsed usage time, as well as dates, times, and elapsed charging time. Parameters regarding the specific battery being charged are also known by the intelligent battery charger. This information is utilized to develop a usage and charging profile for a particular battery in the device for which it is used. To execute a deep cycle, rather than require that the user wait to plug in a charger until the battery level has reached a certain low level, the charger itself controls the on and off operation of the charging system, based on the profiles.

24 Claims, 2 Drawing Sheets

SMART BATTERY CHARGING SYSTEM, METHOD, AND COMPUTER PROGRAM PRODUCT

BACKGROUND OF THE INVENTION

1. Field of the Invention

The present invention relates generally to a battery charging system, and more particularly, to a smart battery charging system that considers device usage when establishing a charging plan for a battery.

2. Description of the Related Art

As mobile computing has become pervasive, portable personal computers (hereinafter referred to as portable PCs) having various sizes and functions have been developed. They include notebook PCs, handheld PCs, and PDAs.

A fundamental element that makes these devices portable is the inclusion of an internal battery which is typically rechargeable. This allows a user to operate the portable PC in an environment in which no commercial power supply is available, for instance, on a plane, outdoors, or other remote environment away from a typical office setting.

The discharging of a battery from a charged state is referred to as a single battery cycle. Thus, a non-rechargeable battery has a service life consisting of a single battery cycle, while a rechargeable battery has a service life of multiple battery cycles. Conventionally, to charge the internal battery of a portable device, a power supply is connected to the portable device, activating a charging circuit in the device to charge the battery using standard wall socket voltage. The batteries used vary in configuration and properties. For example, a lithium-ion battery has different charging requirements than does a nickel cadmium battery. Numerous other battery types are used, including nickel hydrogen batteries, lithium polymer batteries and the like. Unlike disposable non-rechargeable batteries, the rechargeable batteries used with portable devices, such as portable PCs, can be fairly expensive, usually exceeding $100–200 in cost. Thus, it is desirable to extend the service life of a battery as long as possible.

Each battery has what is considered to be an optimal charging cycle to maximize its service life. Certain battery types, for example, will have a longer service life when they are fully discharged before being subjected to recharging. Existing devices having built-in charging systems (such as laptops) do not adapt the charging cycle to match the actual use of the battery. Existing chargers typically continue charging the battery as long as the AC power cord is plugged into the computer. Little consideration is given to the conditioning of the battery and the charge/discharge cycling of the battery by the user. It simply charges to capacity and continues to be so charged until the AC power cord is unplugged.

Laptop computer users are instructed to "deep cycle" their battery to under 3% monthly in an attempt to maximize the battery service life. Compliance with these instructions is left to the battery user. In reality, computer users rarely pattern their charging cycles based on battery condition; rather, they pattern their charging cycles based upon their own use of the device. If the user wants to follow the charging suggestions of the manufacturer, they will have to schedule time to unplug the power cord and allow the battery to completely discharge, an annoying and, at times, unfeasible task.

Accordingly, a need exists for an intelligent charging system which monitors and records the usage patterns of a device in which the battery to be charged is installed, and then patterns an appropriate charging cycle for the battery based upon these usage patterns.

SUMMARY OF THE INVENTION

The present invention is an intelligent battery charger which tracks usage of the device in which the battery is used and the charging and habits of the user. This tracking includes use dates, use times, and elapsed usage time, as well as charge dates, charge times, and elapsed charging time. Parameters regarding the specific battery being charged are also known by the intelligent battery charger. This information is utilized to develop a device usage and charging profile for a particular battery and the device in which it is used, and then executing a charging plan based on the profiles. For example, to execute a deep cycle, rather than require that the user wait to plug in a charger until the battery level has reached a certain low level, the charger itself controls the on and off operation of the charging system, based on the profiles.

DETAILED DESCRIPTION OF THE PREFERRED EMBODIMENTS

Figure 1:
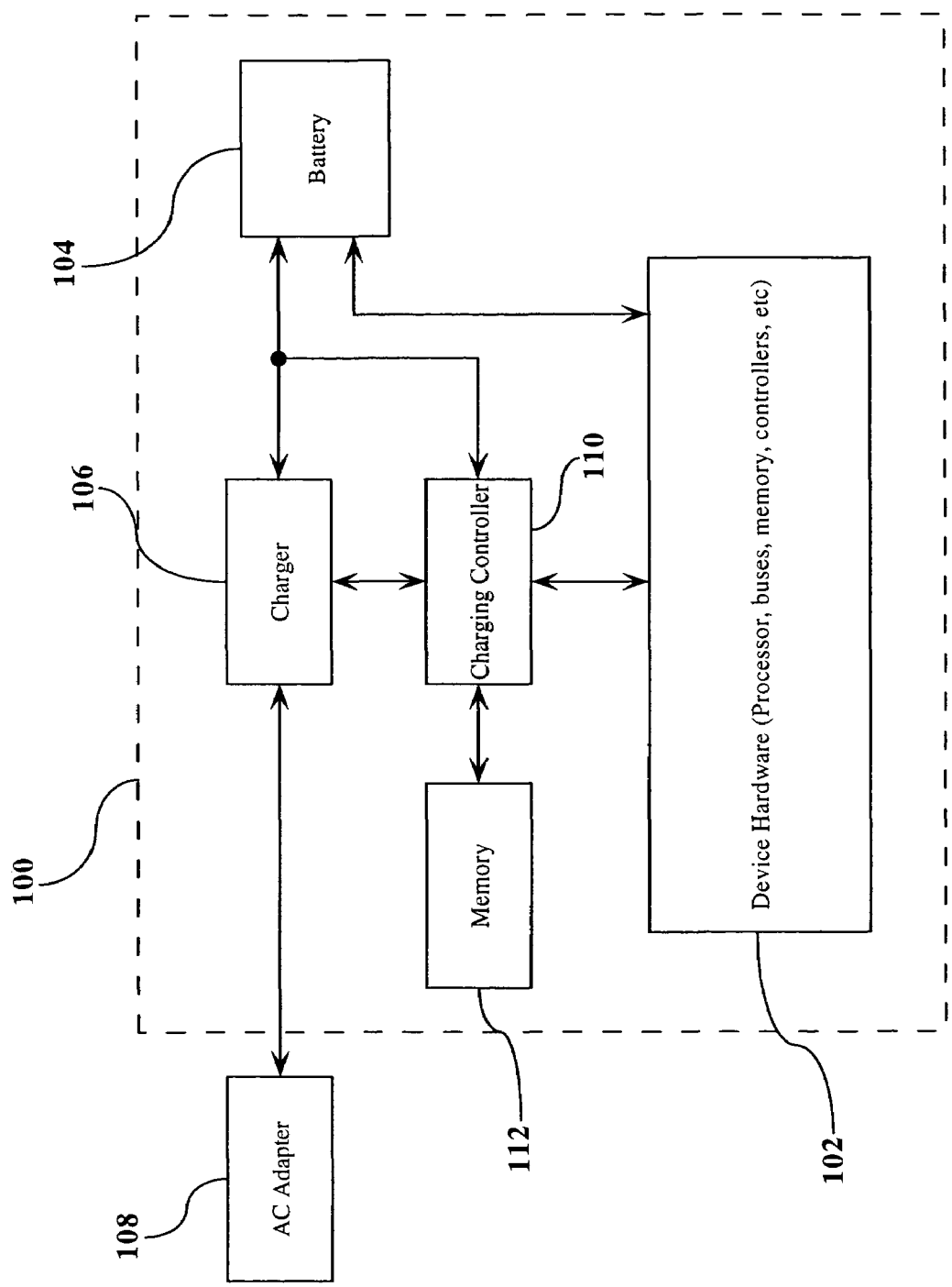
FIG. 1 is a block diagram of a portable device (e.g., a portable laptop computer) and an exemplary hardware configuration in accordance with the present invention.

FIG. 1 is a block diagram of a portable device 100 (e.g., a portable laptop computer) and an exemplary hardware configuration in accordance with the present invention. It is understood that while FIG. 1 shows separate memory, charging controller, and charger elements, all of these elements may be configurable into a single component and/or be distributed among the existing device hardware. For example, the functions of charger controller 110, described below, could be performed via software programming of existing processing devices contained in an existing processing element of laptop computer 100.

Referring to FIG. 1, portable device 100 includes device hardware 102 coupled to a battery 104. In the example of a personal computer, device hardware 102 would comprise, for example, the system processor, memory, I/O devices, such as a keyboard, display screen, and all the other typical components found in a laptop computer.

Battery 104 is charged via a battery charger 106 coupled to an AC power source via AC adaptor 108. This is a typical battery charger configuration for a portable device such as a laptop computer.

In accordance with the present invention, a charging controller 110 is coupled in such a manner that it can send and receive information (data) from charger 106, battery 104, and device hardware 102. Memory 112 is dedicated to charging control; however, it is understood that there is no reason why there must be a dedicated memory for this purpose and that any available memory in the device 100 can be utilized.

The charger controller is a basic processor configured to monitor the conditions of battery 104, the operation of charger 106, and the operation of the device hardware 110, and then store the results of this monitoring operation in memory 112. Thus, charger controller 110 will have access to statistical information regarding battery 104 such as its current capacity, the number of charging cycles it has been through, deep cycle charge history, battery serial number, battery, battery thermal condition, and battery type (referred to collectively as "current charge data"). The charger controller will also have access to data regarding the operation of charger 106, such as the duration of any charging, the times that the charging occurs, the charging levels used, etc. (referred to collectively as "historical charging cycle data"). Finally, with respect to device hardware 102, charging controller 110 will have access to statistical information regarding the timing and dates of operation of the device, the duration of operation, the amount of current drawn by the device hardware during these operations, and the like (referred to collectively as "historical device data").

It is also contemplated that data regarding the particular battery in place in the device can be stored in memory 112 so that varying charging parameters based on the type of battery, for example, can be taken into account when charging controller 110 develops the charging plan. In addition, the serial number of the battery can be used as a unique identifier to capture battery history for different batteries. This information can come from numerous sources, including any or all of: manual input from the user; data downloaded from the battery manufacturer via a network connection such as the Internet; data stored in a memory integrated into the battery itself (e.g., a "smart battery").

As described above, charging controller 110 obtains the most recent charge data from battery 104, the most recent historical charging cycle data from charger 106, and the most recent historical device usage data from device hardware 102. Considering also the specifications of the particular battery in place (e.g., as stored in memory 112), charging controller 110, configured with appropriate software in accordance with the present invention, develops an optimal charging plan. This charging plan may include delaying charging until certain times of day, or until certain values of charge in the battery are reduced to a certain level, depending upon what the optimal battery parameters are.

Figure 2:
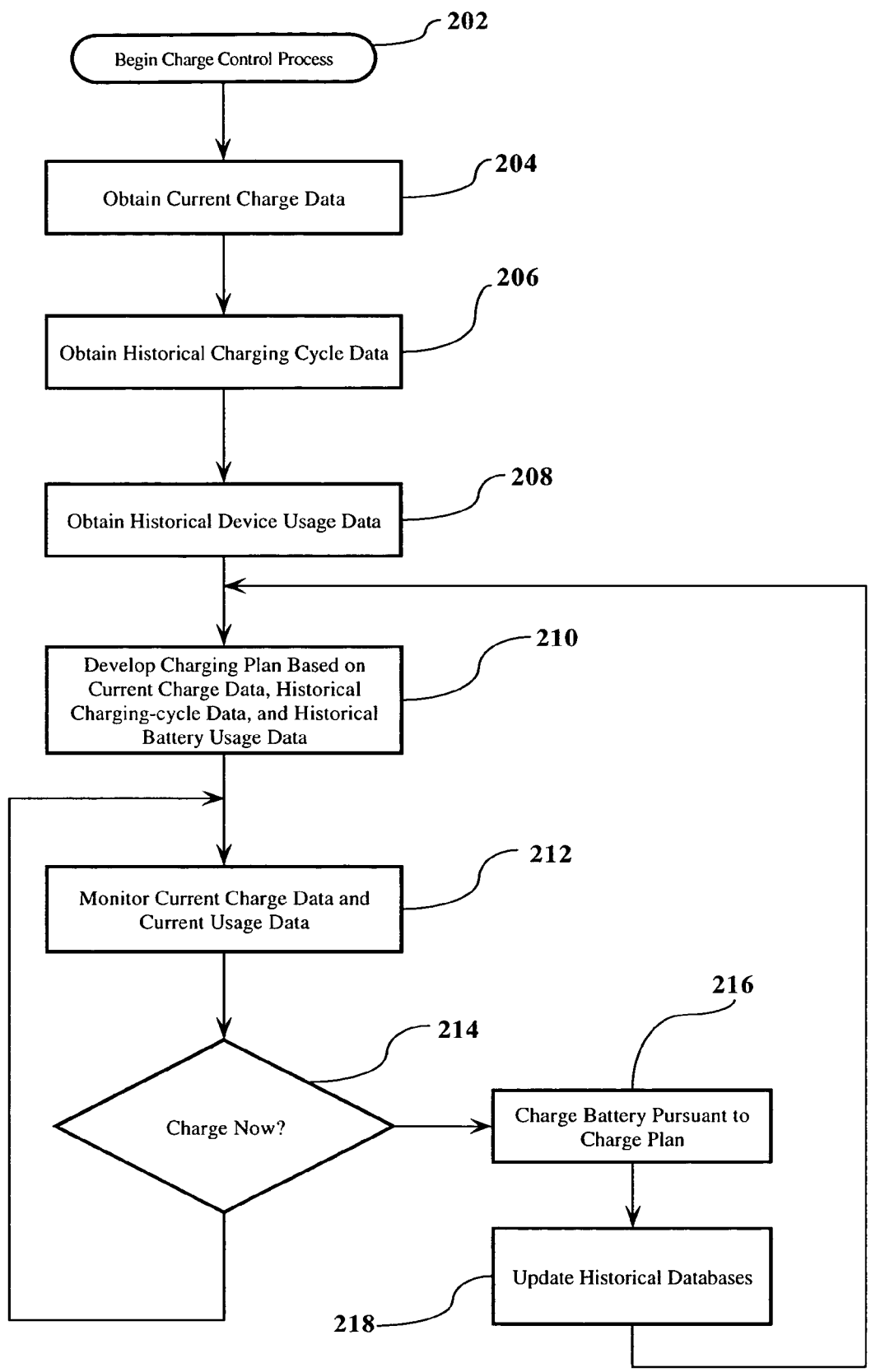
FIG. 2 is a flowchart illustrating an example of steps performed in accordance with the present invention.

FIG. 2 is a flowchart illustrating an example of steps performed in accordance with the present invention. Referring to FIG. 2, at step 202, the charge control process begins. This would typically occur as soon as the device in which the battery is installed is powered up. At step 204, current charge data is obtained and stored in temporary memory. For example, this data will include an identification of the type of battery, the current charge level, the number of cycles that the battery has operated during its life to date, current battery temperature as well as the battery serial number to uniquely identify it from other batteries being charged. At step 206, historical charging cycle data is obtained. This information relates to the amount of time required to bring the battery back to full charge from the point at which a charging cycle began historically, the number of times charging cycles have occurred, the projected battery capacity as it ages, as well as current battery temperature. The result of the analysis of the charging data is the development of a charging profile for the battery.

At step 208, historical device usage data is obtained. This data relates to how the device is used. Since the charging device is built into the device being run by the battery (e.g., a PC), the charging unit has access to the battery user's schedule and can factor this into the preparation of a charging plan, described below. For example, the history of the device's use can be examined and it can be determined that the user always has the computer plugged into a power source and a port replicator from 9 to 5, and then uses the device on battery power for two hours, between 7:30 and 9:30 in the evening on a regular basis. Further, after turning the computer off, the user leaves the laptop plugged in and turned off. This information can be utilized to determine that there will be a several-hour window (from 9:30 p.m. until 9:00 a.m. the next day) when the device will be essentially plugged in but not in use, and a determination can be made to, for example, schedule a long-duration operation such as a deep cycle recharge. The result of the analysis of the device usage is the development of a device usage profile.

In a preferred embodiment, the user is given an opportunity to override the operation scheduled by the system. This is helpful in situations where, for example, the user is not following their "usual" activity (e.g., at 10:00 p.m. the user uses the computer).

At step 210, a charging plan is developed, based upon the current charge data, the historical charging cycle data, and the historical battery usage data obtained in steps 204–208. Since a portable computer typically has a clock built into it, the charging plan can take into consideration time of day issues and the like when determining the best charging cycle plan.

At step 212, the current charge data and current usage data is monitored. At step 214, a determination is made as to whether or not it is an appropriate time to charge the battery, based upon the plan developed in step 210. If yes, the process proceeds to step 216, where the battery is charged pursuant to the charging plan, and at step 218, the historical database is updated so that the new charging and use information can be incorporated into any future plans. The process then proceeds back to step 210, where a revised charging plan is developed based on the new charging date resulting from the charge occurring at step 216.

If, at step 214, it is determined that it is not an appropriate time to charge based on the developed charging plan, the process proceeds back to step 210 to continue monitoring until such time as it is deemed appropriate to charge.

Thus, the battery charging system maintains a history of battery usage and charges, knows the tolerances of the actual battery relative to capacity, age of battery, and current temperature used based on current battery information, obtained by directly communicating with the battery via a communications channel (typically a serial channel located on one of the pins) as well as having an understanding of how to optimally use the battery to its fullest extent, based upon manufacturer's suggestions located either from the battery directly, programmed from the charge controller, or from the manufacturer's information found on the internet. Charging cycles are monitored and when certain tolerances are engaged, corrective action is recommended. In addition, since the charging unit has access to the battery user's schedule, this can be factored into the recommendation for charging.

Before the battery is recharged when placed in the charging mode, the charger compares previous charge cycles against the current charge data and recommends a customized charge. The charger can look at calendar entries (e.g., taken from the user's electronic calendar in Lotus Notes, Microsoft Outlook, etc) to help make charging decisions, and monitor clock cycles (e.g., the system clock of the computer or other device) to determine timing. The charging of the battery may be deferred until an optimal charging time, for example, when the battery has reached a predetermined level of discharge and when the user device is not expected to be in use. Further the charging plan can take into consideration times when the user is unlikely to be using the computer, taken from the calendar entries (e.g., if the user is scheduled to be in a 2-hour meeting, this might be considered to be a good time to conduct a 2-hour charging cycle).

Thus, the present invention takes known parameters and issues relating to the charging of batteries and automates the charging process used based on not only the status of charge of the battery and the specifications of the battery being charged, but also based on the usage patterns of the device in which the battery is placed. This results in battery charging cycles that are better for the battery and does so in a manner least disruptive to the device user.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation in a device driver. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method comprising:
    obtaining historical device usage data of a device in which a battery to be charged resides;
    obtaining current charge data for said battery;
    developing a charging plan for said battery based on said historical device usage data and said current charge data; and
    executing said charging plan to charge said battery, wherein said charging plan prohibits charging of said battery until a discharge state of said battery has reached a pre-determined level.

2. The method of claim 1, wherein said charging plan defers charging of said battery until an optimal charging time.

3. The method of claim 1, wherein said historical device usage data includes times of operation of said device.

4. A method comprising:
    obtaining historical device usage data of a device in which a battery to be charged resides;
    obtaining current charge data and historical charging cycle data for said battery;
    combining said current charge data and historical charging data with said historical device usage data;
    using said combined current charge data, said historical charging data, and said historical device usage data to develop a charging plan; and
    executing said charging plan to charge said battery.

5. The method of claim 4, wherein said device comprises a portable computer.

6. The method of claim 5, wherein said obtaining of said historical device usage data includes:
    tracking times of operation of said device based on the system clock of the portable computer.

7. The method of claim 6, wherein said obtaining of said historical usage data further includes:
    tracking dates of operation of said device based on the system calendar of the portable computer.

8. The method of claim 7, wherein said development of said charging plan is further based on identifying periods available for charging said battery based on entries in a calendar program installed on said computer.

9. A system comprising:
    means for obtaining historical device usage data of a device in which a battery to be charged resides;
    means for obtaining current charge data for said battery;
    means for developing a charging plan for said battery based on said historical device usage data and said current charge data; and
    means for executing said charging plan to charge said battery, wherein said charging plan prohibits charging of said battery until a discharge state of said battery has reached a pre-determined level.

10. The system of claim 9, wherein said charging plan defers charging of said battery until an optimal charging time.

11. The system of claim 9, wherein said historical device usage data includes times of operation of said device.

12. A system comprising:
    means for obtaining historical device usage data of a device in which a battery to be charged resides;
    means for obtaining current charge data and historical charging cycle data for said battery;
    means for combining said current charge data and historical charging data with said historical device usage data;
    means for using said combined current charge data, said historical charging data, and said historical device usage data to develop a charging plan; and
    means for executing said charging plan to charge said battery.

13. The system of claim 12, wherein said device comprises a portable computer.

14. The system of claim 13, wherein said means for obtaining said historical device usage data includes:
    means for tracking times of operation of said device based on the system clock of the portable computer.

15. The system of claim 14, wherein said means for obtaining said historical device usage data further includes:
    means for tracking dates of operation of said device based on the system calendar of the portable computer.

16. The system of claim 15, wherein said development of said charging plan is further based on identifying periods available for charging said battery based on entries in a calendar program installed on said computer.

17. A computer program product comprising a computer readable storage medium having computer readable program code embodied in the medium, the computer readable program code comprising instructions effective when executing to:
    obtain historical device usage data of a device in which a battery to be charged resides;
    obtain current charge data for said battery;
    develop a charging plan for said battery based on said historical device usage data and said current charge data; and
    execute said charging plan to charge said battery, wherein said charging plan prohibits charging of said battery until a discharge state of said battery has reached a pre-determined level.

18. The computer program product of claim 17, wherein said charging plan defers charging of said battery until an optimal charging time.

19. The computer program product of claim 17, wherein said historical device usage data includes times of operation of said device.

20. A computer program product comprising a computer readable storage medium having computer readable program code embodied in the medium, wherein said computer readable program code comprises instructions effective when executing to:
    obtain historical device usage data of a device in which a battery to be charged resides;
    obtain current charge data and historical charging cycle data for said battery;
    combine said current charge data and historical charging data with said historical device usage data;
    use said combined current charge data, said historical charging data, and said historical device usage data to develop a charging plan; and
    execute said charging plan to charge said battery.

21. The computer program product of claim 20, wherein said device comprises a portable computer.

22. The computer program product of claim 21, wherein said computer readable program code for obtaining said historical device usage data includes instructions effective when executing to:
    track times of operation of said device based on the system clock of the portable computer.

23. The computer program product of claim 22, wherein said computer readable program code for obtaining said historical device usage data further includes instructions effective when executing to:
    track dates of operation of said device based on the system calendar of the portable computer.

24. The computer program product of claim 23, wherein said development of said charging plan is further based on identifying periods available for charging said battery based on entries in a calendar program installed on said computer.

* * * * *